(12) United States Patent
Ossig et al.

(10) Patent No.: US 9,835,727 B2
(45) Date of Patent: Dec. 5, 2017

(54) METHOD FOR OPTICALLY SCANNING AND MEASURING AN ENVIRONMENT

(71) Applicant: FARO Technologies, Inc., Lake Mary, FL (US)

(72) Inventors: Martin Ossig, Tamm (DE); Dag Frommhold, Neuffen (DE); Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/620,056

(22) Filed: Jun. 12, 2017

(65) Prior Publication Data

US 2017/0276791 A1    Sep. 28, 2017

Related U.S. Application Data

(63) Continuation of application No. 15/408,894, filed on Jan. 18, 2017, now Pat. No. 9,678,211, which is a (Continued)

(30) Foreign Application Priority Data

May 10, 2010    (DE) .................. 10 2010 020 925

(51) Int. Cl.
*G01B 11/30*  (2006.01)
*G01S 17/89*  (2006.01)
(Continued)

(52) U.S. Cl.
CPC ............ *G01S 17/89* (2013.01); *G01S 7/4808* (2013.01); *G01S 7/4817* (2013.01); *G01S 7/51* (2013.01); *G01S 17/42* (2013.01)

(58) Field of Classification Search
CPC .............. G01B 11/30; G01S 7/51; G01V 8/00
(Continued)

(56) References Cited

U.S. PATENT DOCUMENTS 5,212,738 A    5/1993 Chande et al.
5,337,149 A    8/1994 Kozah et al.
(Continued)

OTHER PUBLICATIONS

International Search Report and Written Opinion for International Application No. PCT/EP2011/001662 dated May 26, 2011; 3 pages.

*Primary Examiner* — Roy M Punnoose
(74) *Attorney, Agent, or Firm* — Cantor Colburn LLP

(57) ABSTRACT

A method, system and computer program product are provided for displaying three-dimensional measurement points on a two-dimensional plane of a display screen having a plurality of pixels. The method includes projecting the measurement points onto the plane. Each of the measurement points is assigned to one of the pixels. A depth value is assigned to each of the pixels. A first pixel is selected having a first measurement point and a first depth value. A first side is searched for a second pixel having a second measurement point and a second depth value. A second side is searched for a third pixel having a third measurement point and a third depth value. It is determined whether the second and third measurement points are on a same plane. The first depth value of the first pixel is changed when the second and third measurement points are on the same plane.

15 Claims, 4 Drawing Sheets

Related U.S. Application Data continuation of application No. 15/140,909, filed on Apr. 28, 2016, now Pat. No. 9,684,078, which is a continuation of application No. 13/697,031, filed as application No. PCT/EP2011/001662 on Apr. 1, 2011, now Pat. No. 9,329,271.

(60) Provisional application No. 61/362,810, filed on Jul. 9, 2010.

(51) Int. Cl.
    *G01S 7/48*     (2006.01)
    *G01S 17/42*     (2006.01)
    *G01S 7/51*     (2006.01)
    *G01S 7/481*     (2006.01)

(58) Field of Classification Search
    USPC .......................................................... 356/601
    See application file for complete search history.

(56) References Cited

U.S. PATENT DOCUMENTS

| | | | |
|---|---|---|---|
| 5,577,130 A | 11/1996 | Wu | |
| 5,754,680 A | 5/1998 | Sato | |
| 5,956,661 A | 9/1999 | Lefebvre et al. | |
| 6,480,270 B1 | 11/2002 | Studnicka et al. | |
| 6,542,249 B1 | 4/2003 | Kofman et al. | |
| 6,922,234 B2 | 7/2005 | Hoffman et al. | |
| 7,403,268 B2 * | 7/2008 | England | G01C 15/002 356/4.01 |
| 7,447,360 B2 | 11/2008 | Li et al. | |
| 7,477,359 B2 * | 1/2009 | England | G01S 7/51 356/4.01 |
| 7,477,360 B2 * | 1/2009 | England | G06T 11/60 356/4.01 |
| 7,777,761 B2 * | 8/2010 | England | G01S 17/89 345/619 |
| 7,847,922 B2 * | 12/2010 | Gittinger | F41J 5/00 356/141.5 |
| 7,974,461 B2 * | 7/2011 | England | G01C 15/002 356/601 |
| 8,384,914 B2 * | 2/2013 | Becker | G01C 15/002 356/141.5 |
| 9,678,211 B2 * | 6/2017 | Ossig | G01S 17/89 |
| 2003/0035100 A1 | 2/2003 | Dimsdale et al. | |
| 2005/0141052 A1 * | 6/2005 | Becker | G02B 26/10 358/475 |
| 2006/0193521 A1 | 8/2006 | England, III et al. | |
| 2007/0024620 A1 | 2/2007 | Muller-Fischer et al. | |
| 2007/0064976 A1 | 3/2007 | England, III | |
| 2010/0195086 A1 * | 8/2010 | Ossig | G01S 7/491 356/5.01 |
| 2012/0133953 A1 * | 5/2012 | Ossig | G01S 7/497 356/601 |
| 2015/0226840 A1 | 8/2015 | Becker et al. | |

* cited by examiner

METHOD FOR OPTICALLY SCANNING AND MEASURING AN ENVIRONMENT

CROSS REFERENCE TO RELATED APPLICATIONS

The present application is a continuation application of U.S. application Ser. No. 15/408,894 filed on Jan. 18, 2017. Application Ser. No. 15/08,894 is a continuation application of U.S. application Ser. No. 15/140,909 filed on Apr. 28, 2016, which is a continuation application of U.S. application Ser. No. 13/697,031 filed on Apr. 29, 2013, now U.S. Pat. No. 9,329,271, which is a National Stage Application of PCT Application No. PCT/EP2011/001662, filed on Apr. 1, 2011, which claims the benefit of U.S. Provisional Patent Application No. 61/362,810, filed on Jul. 9, 2010, and of German Patent Application No. DE 10 2010 020 925.2, filed on May 10, 2010, and which are hereby incorporated by reference.

BACKGROUND

The invention relates to a method for optically scanning and measuring an environment.

Through use of a known method of this kind, a three-dimensional scan is recorded which is then displayed two-dimensionally. Provided that density and extension of the measurement points are smaller than the pixels of the display, a relatively better visual impression is generated if a gap-filling takes place between the measurement points, i.e., if surfaces are generated from the single measurement points. All measurement points can thus be projected onto one plane and be assigned to single pixels. The intermediate pixels of the plane are then filled, for example, by interpolation.

SUMMARY

According to an embodiment of the present invention, a method, system and computer program product are provided for displaying a plurality of measurement points in three-dimensional space on a two-dimensional plane of a display screen. The method includes emitting an emission light beam from a source onto one or more surfaces. A reception light beam is received at the source that is reflected from the one or more surfaces, the reception light beam including a plurality of measurement points. A spatial position is determined for each of the plurality of measurement points relative to the source based at least in part on the reception light beam. At least a portion of the plurality of measurement points are displayed on a display, the display comprising a two-dimensional plane having a plurality of pixels that each have a filled-in value, each filled-in value associated with pixels corresponding to the spatial location of a measurement point has a first filled-in value; each filled-in value associated with pixels not corresponding to a measurement point having a second filled-in value, wherein the second filled-in value is zero. An interpolation of a pixel filled-in value is performed for at least one of the one or more pixels having the second filled-in value. The step of interpolating comprises the steps of: assigning a depth value to each pixel having a first filled-in value, each depth value comprising a distance from a corresponding one of the plurality of measurement points to a 2D plane represented on the display; for each pixel having a second filled-in value, searching a predetermined number of adjacent first pixels, determining when the first pixels have a first filled-in value, and changing the second filled-in value of the associated pixel based at least in part on the first filled-in value of the first pixels; and for each pixel having a first filled-in value, searching a predetermined number of adjacent second pixels, determining when the second pixels have the first filled-in value, and changing the first filled-in value of the pixel based on at least two pixel filled-in values from the second pixels.

BRIEF DESCRIPTION OF THE DRAWINGS

Embodiments of the present invention are explained in more detail below on the basis of exemplary embodiments illustrated in the drawings, in which.

DETAILED DESCRIPTION

Figure 1:
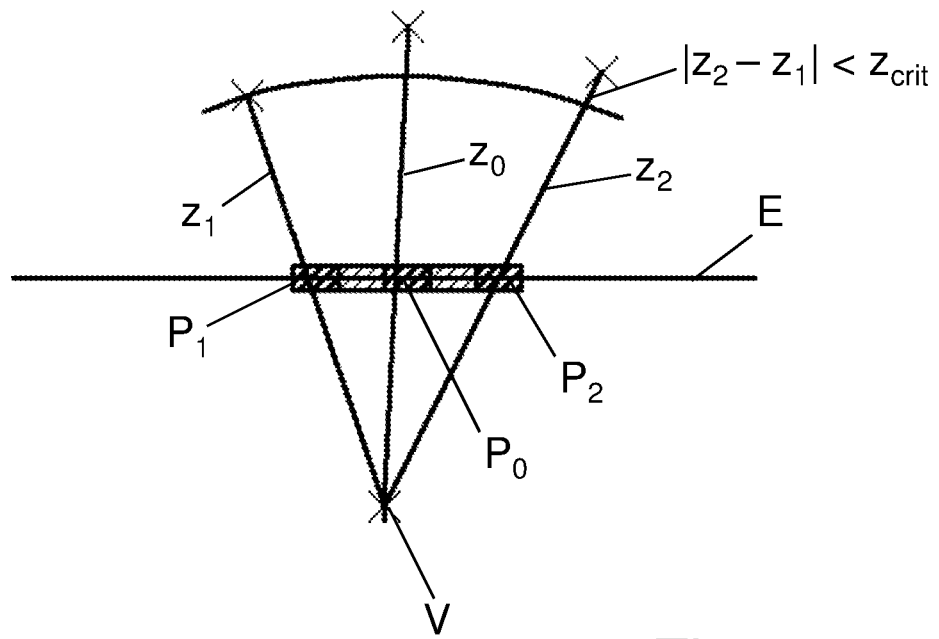
FIG. 1 is a schematic illustration of the assignment and filling of the pixels with a view onto the plane, wherein the adjacent pixels are on the same surface.
Figure 2:
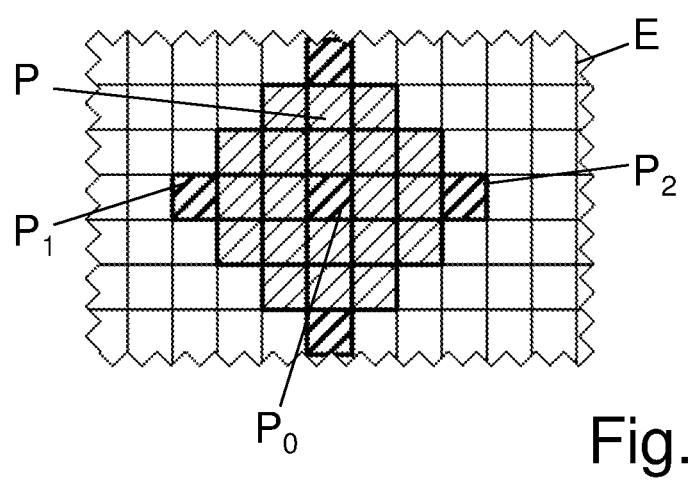
FIG. 2 is a schematic illustration of the assignment and filling of the pixels, according to FIG. 1, with a view onto the plane.
Figure 3:
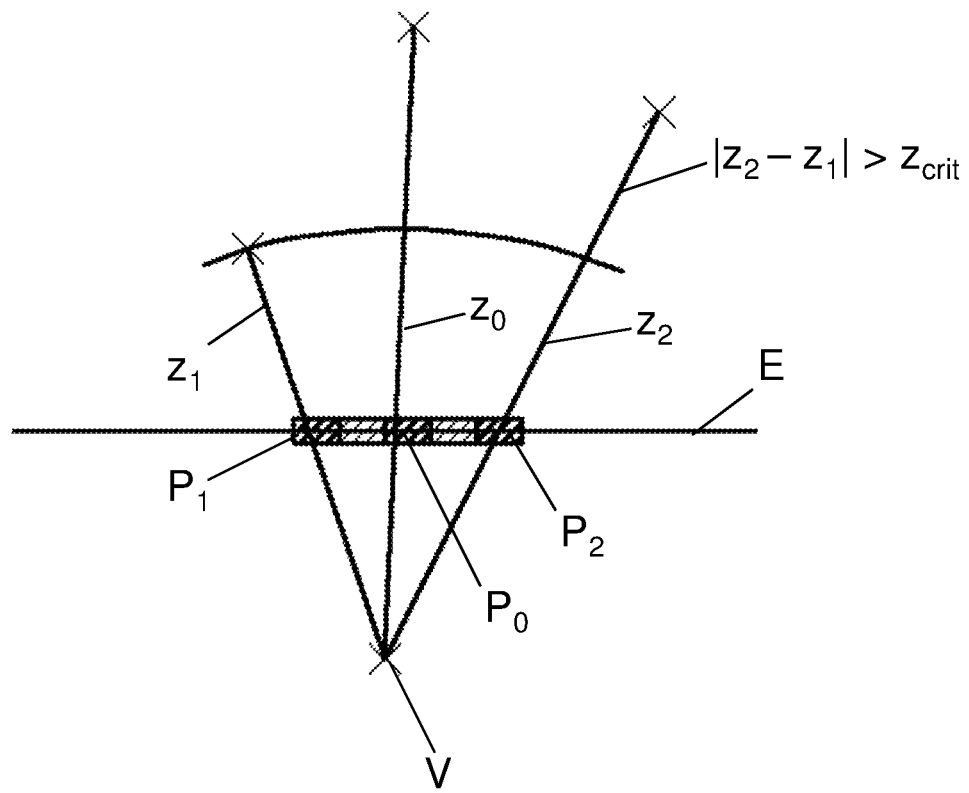
FIG. 3 is a schematic illustration of the assignment and filling of the pixels with a view onto the plane, wherein the adjacent pixels are located on different surfaces.
Figure 4:
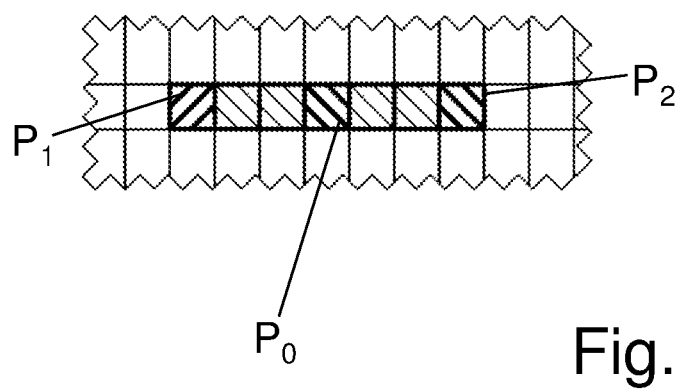
FIG. 4 is a schematic illustration of the assignment and filling of the pixels, according to FIG. 3, with a view onto the plane.

Referring to the Figures, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16 that can be rotated about a horizontal axis. The point of intersection between the two axes of rotation is designated as the center $C_{10}$ of the laser scanner 10.

The measuring head 12 also has a light emitter 17 for emitting an emission light beam 18. The emission light beam 18 may be a laser beam in the range of wave length of approximately 300 to 1600 nm, for example, 790 nm, 905 nm or less than 400 nm, but other electro-magnetic waves having, for example, a greater wave length can be used. The emission light beam 18 is amplitude-modulated with, for example, a sinusoidal or rectangular-waveform modulation signal. The emission light beam 18 is passed from the light emitter 17 onto the rotary mirror 16 where it is deflected and then emitted into the environment. A reception light beam 20, which is reflected by or otherwise scattered from an object O, is captured again by the rotary mirror 16, deflected and passed onto a light receiver 21. The direction of the emission light beam 18 and of the reception light beam 20 results from the angular positions of the rotary mirror 16 and the measuring head 12, which depend on the positions of their respective rotary drives which are, in turn, detected by a respective encoder.

A control and evaluation device 22 has a data link connection to the light emitter 17 and to the light receiver 21 in the measuring head 12, parts thereof being arranged also outside the measuring head 12, for example as a computer connected to the base 14. The control and evaluation device 22 determines, for a multiplicity of measurement points X, the distance d of the laser scanner 10 from the illuminated point on the object O, and from the propagation times of emission light beam 18 and reception light beam 20. For this purpose, the phase shift between the two light beams 18 and 20 can be determined and evaluated.

Through use of the relatively rapid rotation of the mirror 16, scanning takes place along a circular line. Also, through use of the relatively slow rotation of the measuring head 12 relative to the base 14, the entire space is gradually scanned with the circular lines. The totality of the measurement points X of such a measurement shall be designated as a scan. The center $C_{10}$ of the laser scanner 10 defines for such a scan the origin of the local stationary reference system. The base 14 is stationary in this local stationary reference system.

In addition to the distance d to the center $C_{10}$ of the laser scanner 10, each measurement point X comprises a brightness value which may also be determined by the control and evaluation device 22. The brightness is a gray-tone value which is determined, for example, by integration of the bandpass-filtered and amplified signal of the light receiver 21 over a measuring period which is assigned to the measurement point X. Through use of a color camera, it is optionally possible to generate pictures, by which colors (R, G, B) can be assigned as a value to the measurement points X in addition to the brightness or comprising the brightness.

A display device 30 is connected to the control and evaluation device 22. The display device 30 can be integrated into the laser scanner 10, for example into the measuring head 12 or into the base 14, or it can be an external unit, for example part of a computer which is connected to the base 14. The display device 30 has a graphic card 32 and a screen 34 which can be arranged separately from one another or as a structural unit. The control and evaluation device 22 provides 3D data of the scan.

Figure 5:
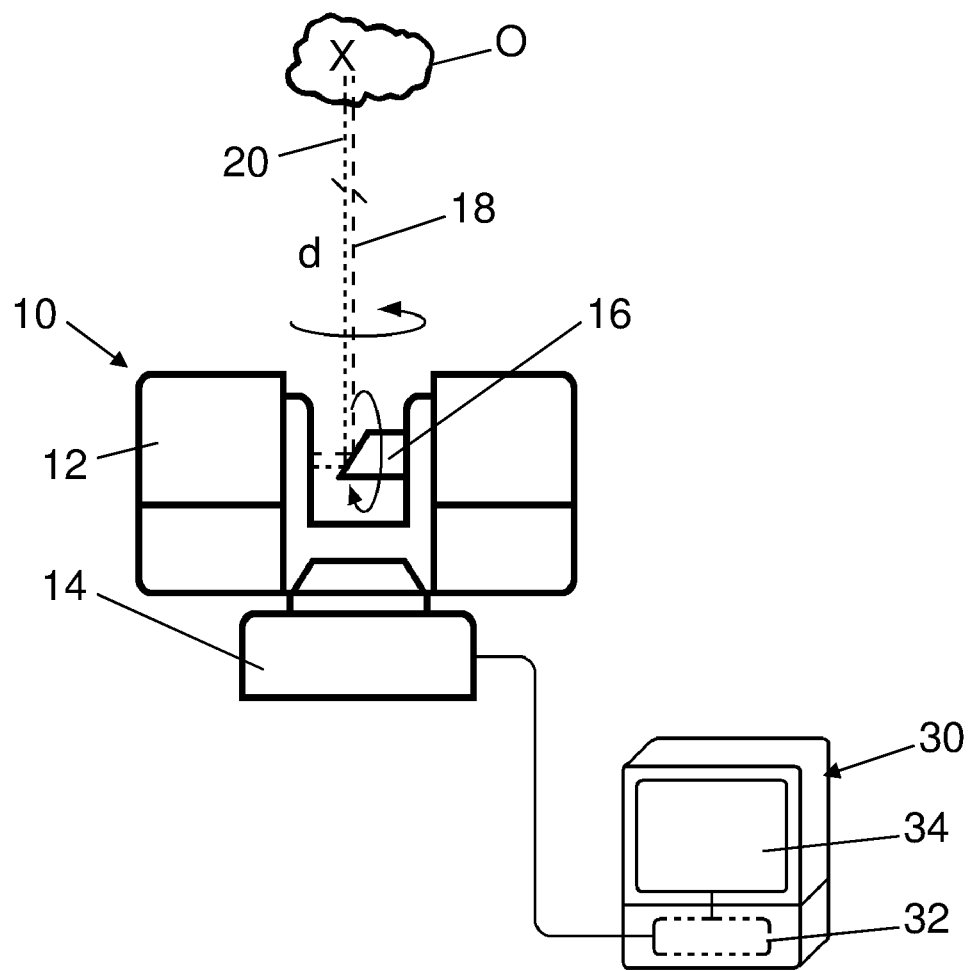
FIG. 5 is a schematic illustration of a laser scanner in the environment including the display device.
Figure 6:
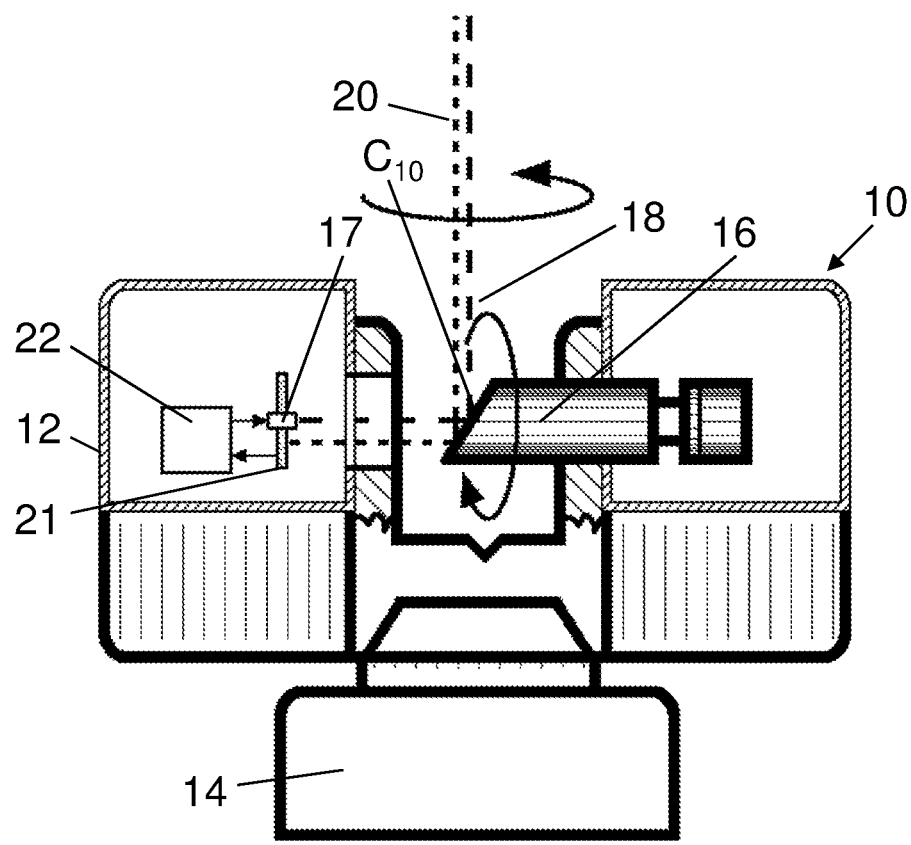
FIG. 6 is a partial sectional illustration of the laser scanner.

Referring also to FIGS. 1-4 as well as FIGS. 5 and 6, the graphic card 32 converts the 3-D data into 2-D data (e.g., rendering data), which are displayed on the screen 34. The 3-D data are the measurement points X, wherein several scans from different positions of the laser scanner 10 can be assembled into one scene. For representing the 2-D data, there are pixels P, i.e., adjacent, small polygonal surfaces (e.g. squares or hexagons), which are arranged in a two-dimensional plane E which corresponds to the screen 34. The starting point is the projection of the measurement points X onto the plane E with a viewer (e.g., eye, camera), at a certain viewpoint V. The projection appears to be in perspective (i.e., the viewpoint V is in the finite) or orthographical (i.e., the viewpoint V in is the infinite). The projected measurement points X are assigned to single pixels P. A Z-buffer serves for representing the 2-D data, i.e., a two-dimensional auxiliary field for the pixels P. In this Z-buffer, a field element (e.g., depth z) is assigned to each pixel P. The depth z of each projected measurement point X corresponds to the distance of the measurement point X to the plane E with respect to the viewpoint V. The field of the pixels P and the Z-buffer may be treated in the same way as the images.

The viewpoint V may be arbitrary per se and is usually changed several times when regarding the scan and/or the scene.

Since the measurement points X are punctiform, with gaps in between, and the pixels P usually, in the case of nearby objects O, have a higher density in the plane E than the projections of the measurement points X, a gap-filling is carried out to fill as many pixels P as possible for an improved representation. The graphic card 32 carries this out in parallel using the 3-D data and the indication of the viewpoint V and of the plane E.

Initially only those pixels P are filled to which the projection of a measurement point X is assigned, i.e., which exactly cover one measurement point X. These pixels P are filled with the value of the assigned measurement point X, i.e., brightness and, where applicable, color. All other pixels P, which do not exactly correspond with a projection of a measurement point X, i.e., which are "in between" are empty at first, for example are set to zero. Each of the depths z, i.e., the field elements of the Z-buffer, which are assigned to the initially filled pixels P, is set to that depth $z_0$, $z_1$, $z_2$, which corresponds to the distance of the assigned measurement point X to the plane E. All other field elements of the Z-buffer (e.g., depths z) are set to an extreme value, for example, to infinite. If, when the projection of the measurement points X is made, it turns out that two measurement points X are available for one pixel P, the measurement point having the smaller depth z is selected and the other one is rejected, so that covered surfaces and covered edges are not visible.

According to embodiments of the present invention, gap-filling takes place in dependence on the depth $z_0$, $z_1$, $z_2$, i.e., on the distance to the plane E. The graphic card 32 selects all pixels P in parallel with respect to time. By way of example, one selected pixel $P_0$ is regarded now. The assigned depth z, i.e., field element of the Z-buffer, contains the depth $z_0$. For each selected pixel $P_0$ the adjacent pixels $P_1$, $P_2$, are searched consecutively, i.e., to the left and to the right and above and below. If the adjacent pixel $P_1$ is not yet filled or if its depth z is bigger than the depth $z_0$ of the selected pixel $P_0$, it is skipped and the second next pixel P is taken as adjacent pixel $P_1$, if necessary iteratively. If an adjacent pixel $P_1$, the depth $z_1$ of which is smaller than the depth $z_0$ of the selected pixel $P_0$, is found in one of the directions, a change to the next direction takes place, and it is looked for the adjacent pixel $P_2$ (e.g., the depth $z_2$ of which is smaller than the depth $z_0$ of the selected pixel $P_0$). It is possible to define a maximum number of skipped pixels, i.e., if the adjacent pixel $P_1$ or $P_2$ is not yet found after skipping the maximum number of skipped pixels, the search for $P_1$ or $P_2$ is aborted.

If the adjacent pixels $P_1$ and $P_2$ to the selected pixel $P_0$ have been found in opposite directions, with the depths $z_1$ and $z_2$ of the adjacent pixels $P_1$ and $P_2$ being smaller than the depth $z_0$, it is checked whether $P_1$ and $P_2$ are on the same plane, i.e., whether the amount of the difference of $z_2$ and $z_1$ is below a threshold value for the depth $z_{crit}$, i.e., $$|z_2 - z_1| < z_{crit}$$

applies. In such a case, the selected pixel $P_0$ is filled with the value which is interpolated between $P_1$ and $P_2$, i.e., brightness and, if applicable color. The assigned field element of the Z-buffer is likewise set to the interpolated depth between $z_1$ and $z_2$. Interpolation depends on the distance of the selected pixel $P_0$ from $P_1$ and $P_2$ in plane E.

If the difference of the depths is too big, i.e., the condition $$|z_2 - z_1| > z_{crit}$$

applies, it is assumed that $P_1$ and $P_2$ are located on different planes. The selected pixel $P_0$ is then filled with the value, i.e., brightnesses and, if applicable color, of, for example, the more remote pixel $P_1$ or $P_2$, and the assigned field element of the Z-buffer with the bigger depth $z_1$ or $z_2$. Alternatively, the value and the depth of pixel $P_1$ or $P_2$ having the smaller depth $z_1$ or $z_2$ is transferred. In the case of more than two adjacent pixels $P_1$, $P_2$, the average value of the majority, i.e., of the adjacent pixels $P_1$, $P_2$, which are located on the same surface, can be transferred.

Selected pixels $P_0$, which are already filled with values of the measurement points, are overwritten by the interpolation of the values of the adjacent pixels $P_1$ and $P_2$. Alternatively, a selected pixel $P_0$, which is already filled, remains unvaried.

If pixels P have been skipped when finding the pixels $P_1$ and $P_2$, because they were not filled or because their depth z was too big, their adjacent pixels $P_1$, $P_2$ are the same as with the selected pixel $P_0$, so that the skipped pixels P and the assigned field elements of the Z-buffer, within the framework of the selection taking place in parallel, are likewise filled either with a value which is interpolated between the pixels $P_1$ and $P_2$ and/or the depths $z_1$ and $z_2$ (depending on the distance of the selected pixel $P_0$ from $P_1$ and $P_2$ in plane E) or with the value and/or the depth $z_1$ or $z_2$ of the more remote one among pixels $P_1$ or $P_2$ (or the average value of the majority).

Due to the selection taking place in parallel, filling with the value and/or the depth $z_1$ or $z_2$ of the more remote among the pixels $P_1$ or $P_2$ on account of a difference of depths which is too big, leads to the closer-by pixel $P_1$ or $P_2$ forming an edge. Even if no adjacent pixel $P_1$ or $P_2$ is found, the depth $z_1$ or $z_2$ of which is smaller than the depth $z_0$ of the selected pixel $P_0$, since the selected pixel $P_0$ is at the side of the screen 34, an edge is generated, since these selected pixels $P_0$ at the edge are not filled then.

Gap-filling may take place once again to fill further pixels, i.e., to improve the representation once again.

Gap-filling may take place in the control and evaluation device 22 or by software running on an external computer. Due to the savings in time by a parallel selection, the hardware-based gap-filling on the graphic card 32 may be used together with the programming interface of the latter.

What is claimed is:

1. A method, comprising:
    emitting an emission light beam from a source onto one or more surfaces;
    receiving, at the source, a reception light beam reflected from the one or more surfaces, the reception light beam including a plurality of measurement points;
    determining a spatial position of each of the plurality of measurement points relative to the source based at least in part on the reception light beam;
    displaying at least a portion of the plurality of measurement points, the display comprising a two-dimensional plane having a plurality of pixels that each have a filled-in value, each filled-in value associated with pixels corresponding to the spatial location of a measurement point has a first filled-in value; each filled-in value associated with pixels not corresponding to a measurement point having a second filled-in value, wherein the second filled-in value is zero; and
    interpolating a pixel filled-in value for at least one of the one or more pixels having the second filled-in value;
    wherein the step of interpolating comprises the steps of:
    assigning a depth value to each pixel having a first filled-in value, each depth value comprising a distance from a corresponding one of the plurality of measurement points to a 2D plane represented on the display;
    for each pixel having a second filled-in value, searching a predetermined number of adjacent first pixels, determining when the first pixels have a first filled-in value, and changing the second filled-in value of the associated pixel based at least in part on the first filled-in value of the first pixels; and
    for each pixel having a first filled-in value, searching a predetermined number of adjacent second pixels, determining when the second pixels have the first filled-in value, and changing the first filled-in value of the pixel based on at least two pixel filled-in values from the second pixels.

2. The method of claim 1, wherein the one or more surfaces comprise an object.

3. The method of claim 1, wherein the one or more surface comprise at least one surface in an environment.

4. The method of claim 1, further comprising providing a laser scanner at a location of the source, wherein the laser scanner is operable to perform the steps of emitting, from a source, an emission light beam at the one or more surface, and receiving, at the source, a reception light beam that represents the emission light beam reflected from the one or more surfaces back to the source, the plurality of measurement points within the reception light beam comprising a scan of the one or more surfaces taken by the laser scanner.

5. The method of claim 4, wherein the laser scanner further comprises a processor that determines in operation the distance from the source to the scene at each of the different spatial locations on the one or more surfaces.

6. The method of claim 4, wherein the scan of the one or more surfaces comprises a plurality of scans performed by the laser scanner located at different positions, and wherein the plurality of scans are combined together into a single scan.

7. The method of claim 1, wherein each of the plurality of measurement points comprises a three-dimensional (3D) data point with respect to the one or more surfaces.

8. The method of claim 7, wherein the laser scanner further comprises a processor that converts in operation the plurality of 3D data points into a corresponding plurality of 2D data points, and to display at least some of the plurality of 2D data points on the display screen.

9. The method of claim 1, wherein the first filled-in value is based at least in part on a brightness value associated with the corresponding measurement point.

10. The method of claim 9, wherein the first filled-in value of each of the pixels is based at least in part on a brightness value and a color value that is each associated with the corresponding measurement point.

11. The method of claim 1, wherein the step of interpolating further comprises, for a pixel having a first filled-in value being at a location on the display screen that corresponds to the spatial location of two or more measurement points, changing the filled in value of the pixel to a filled-in value for the pixel filled-in value that has a smaller depth value of the two or more measurement points.

12. The method of claim 1, wherein the step of determining when the first pixels have a first filled-in value further comprises:
    skipping an adjacent pixel that second filled in value of zero or that has a first filled-value with a corresponding depth value that is greater than the depth value of the pixel being searched; and
    searching a next consecutive pixel adjacent to the skipped adjacent pixel and determining the filled-in value of the next consecutive pixel.

13. The method of claim 1, wherein the step of, determining when the first pixels have a first filled-in value further comprises:
    identifying the pixel filled-in value for an adjacent first pixel in a first direction in which the pixel filled-in value has a corresponding depth value that is smaller than the depth value of the pixel being searched; and searching a number of adjacent pixels in a second direction with respect to the pixel being searched, the second direction being different than the first direction.

14. The method of claim 13 wherein the step of searching a number of adjacent pixels in a second direction further comprises:
identifying the pixel filled-in value for an adjacent first pixel in the second direction in which the pixel filled-in value has a corresponding depth value that is smaller than the depth value of the pixel being searched;
determining when the identified first pixel filled-in values for the adjacent pixels in the first direction and second direction have a difference value that is below a threshold value, and interpolating a filled-in value from the identified first pixel filled-in values and using the interpolated filled-in value for the pixel being searched.

15. The method of claim 14 wherein the step of searching a number of adjacent pixels in a second direction further comprises assigning the interpolated filled-in value for the pixel being searched based at least in part on the identified pixel filled-in values for the one of the adjacent first pixels in the first and second directions that is further remote from the pixel being searched.

\* \* \* \* \*